United States Patent
Baer et al.

(10) Patent No.: US 11,199,154 B1
(45) Date of Patent: Dec. 14, 2021

(54) NESTED CYLINDER HEAD

(71) Applicants: Patrick H Baer, Clarkston, MI (US); Constantin Hagiu, Windsor (CA); Christopher Capitan, Sterling Heights, MI (US)

(72) Inventors: Patrick H Baer, Clarkston, MI (US); Constantin Hagiu, Windsor (CA); Christopher Capitan, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/112,526

(22) Filed: Dec. 4, 2020

(51) Int. Cl.
| | |
|---|---|
| F02F 1/24 | (2006.01) |
| F01P 3/02 | (2006.01) |
| F02F 1/36 | (2006.01) |
| B23K 20/02 | (2006.01) |
| B23K 103/10 | (2006.01) |

(52) U.S. Cl.
CPC ............ F02F 1/242 (2013.01); B23K 20/021 (2013.01); F01P 3/02 (2013.01); F02F 1/36 (2013.01); B23K 2103/10 (2018.08); F01P 2003/024 (2013.01); F02F 2001/248 (2013.01); F02F 2200/06 (2013.01)

(58) Field of Classification Search
CPC ..... B23K 103/10; B23K 20/021; F02F 1/242; F01P 3/02
See application file for complete search history.

(56) References Cited

U.S. PATENT DOCUMENTS

| | | |
|---|---|---|
| 8,506,284 B2 | 8/2013 | Bergman |
| 8,655,476 B2 | 2/2014 | Wang et al. |
| 9,039,917 B2 | 5/2015 | Szuromi et al. |
| 9,358,747 B2 | 6/2016 | Gärdin |
| 9,782,829 B2 | 10/2017 | Morris et al. |
| 10,093,042 B2 * | 10/2018 | Williams .............. B29C 43/003 |
| 2016/0263655 A1 | 9/2016 | Chang et al. |

OTHER PUBLICATIONS

"How It Works: Edelbrock's HIP Cylinder Head Casting Tech", Hot Rod, Motortrend, https://www.motortrend.com/how-to/how-it-works-edelbrocks-hip-cylinder-head-casting-tech/, Jun. 30, 2016 (Year: 2016).*

* cited by examiner

Primary Examiner — Kevin A Lathers
(74) Attorney, Agent, or Firm — Ralph E. Smith

(57) ABSTRACT

A cylinder head assembly for an internal combustion engine includes a cast cylinder head defining a combustion chamber and fabricated from a first material, and an internal support structure at least partially encapsulated within the cast cylinder head. The internal support structure is fabricated from a thermal strain and fatigue resistant second material, different from the first material, such that during engine operation, thermal and mechanical loads are transferred to the internal support structure to reduce combustion chamber displacement. The internal support structure and the cylinder head are bonded via a hot isostatic pressing (HIP) process to eliminate internal porosity and gaps therebetween.

19 Claims, 3 Drawing Sheets

NESTED CYLINDER HEAD

CROSS-REFERENCE TO RELATED APPLICATION

This application claims the benefit of U.S. Provisional No. 62/943,460, filed Dec. 4, 2019, the contents of which are incorporated herein by reference thereto.

FIELD

The present application relates generally to internal combustion engines and, more particularly, to a cylinder head with an internal support structure.

BACKGROUND

Modern turbocharged and supercharged engines can experience high cylinder pressure loads that can potentially result in combustion chamber displacement or "oil canning." Such conditions can potentially cause high valve seat wear and possibly valve leakage, fatigue, and cracking. Additionally, such engines can have high thermal gradients that can potentially reduce cylinder head fatigue resistance and increase combustion chamber and valve face/seat surface temperatures, which can potentially induce knock and pre-ignition tendencies. While such conventional engines work well for their intended purpose, there remains a desire for improvement in the relevant art.

SUMMARY

According to one example aspect of the invention, a cylinder head assembly for an internal combustion engine is provided. In one example configuration, the cylinder head assembly includes a cast cylinder head defining a combustion chamber and fabricated from a first material, and an internal support structure at least partially encapsulated within the cast cylinder head. The internal support structure is fabricated from a thermal strain and fatigue resistant second material, different from the first material, such that during engine operation, thermal and mechanical loads are transferred to the internal support structure to reduce combustion chamber displacement. The internal support structure and the cylinder head are bonded via a hot isostatic pressing (HIP) process to eliminate internal porosity and gaps therebetween.

In addition to the foregoing, the described cylinder head assembly may include one or more of the following features: wherein the second material has higher strength, fatigue resistance, and heat transfer properties than the first material; wherein the second material is a metal matrix composite (MMC); wherein the second material is aluminum silicon carbide; wherein the first material is aluminum; and wherein the internal support structure is totally encapsulated within the cast cylinder head and then subjected to the HIP process, and wherein the internal support structure is not disposed in machined areas.

In addition to the foregoing, the described cylinder head assembly may include one or more of the following features: wherein the cylinder head further includes a water jacket, and wherein the internal support structure includes a plurality of fins extending into the water jacket configured to increase surface area exposure to coolant flowing the water jacket to increase heat transfer from the cylinder head to the internal support structure; wherein the cylinder head defines the combustion chamber with at least one intake port and at least one exhaust port; and wherein the cylinder head further includes a bridge wall adjacent the at least one intake port and the at least one exhaust port, wherein at least a portion of the bridge wall includes the internal support structure to facilitate reducing thermal strain and fatigue at the bridge wall.

In addition to the foregoing, the described cylinder head assembly may include one or more of the following features: wherein the cylinder head further includes a water jacket separated from that at least one intake port by a bridge wall, wherein at least a portion of the bridge wall includes the internal support structure to facilitate reducing thermal strain and fatigue at the bridge wall; wherein the cylinder head further includes a spark plug bore and an injector bore; and wherein the cylinder head further includes a bridge wall between the spark plug bore and the injector bore, wherein at least a portion of the bridge wall includes the internal support structure to facilitate reducing thermal strain and fatigue at the bridge wall.

In addition to the foregoing, the described cylinder head assembly may include one or more of the following features: wherein the cylinder head further includes a bridge wall between the spark plug bore and the at least one intake port, wherein at least a portion of the bridge wall includes the internal support structure to facilitate reducing thermal strain and fatigue at the bridge wall; wherein the cylinder head further includes a second bridge wall between the injector bore and the at least one exhaust port, and wherein at least a portion of the second bridge wall includes the internal support structure to facilitate reducing thermal strain and fatigue at the second bridge wall; and wherein the combustion chamber is defined by an internal wall, wherein at least a portion of the internal wall is an end surface of the internal support structure.

According to one example aspect of the invention, a method of manufacturing a cylinder head assembly for an internal combustion engine is provided. In one example configuration, the method includes forming an internal support structure, casting a cylinder head defining a combustion chamber from a first material, and at least partially encapsulating the internal support structure in the cylinder head casting. The internal support structure is fabricated from a thermal strain and fatigue resistant second material, different from the first material, such that during engine operation, thermal and mechanical loads are transferred to the internal support structure to reduce combustion chamber displacement. The internal support structure and the cylinder head are subjected to a hot isostatic pressing (HIP) process to bond the first and second materials to eliminate internal porosity and gaps therebetween.

In addition to the foregoing, the described method may include one or more of the following features: wherein the second material is a metal matrix composite (MMC); casting the cylinder head with a plurality of bridge walls each including the internal support structure to facilitate reducing thermal strain and fatigue at each bridge wall of the plurality of bridge walls; and forming the internal support structure with a plurality of fins, which extend into a water jacket formed in the cylinder head to thereby increase surface area exposure to coolant flowing in the water jacket to increase heat transfer from the cylinder head to the internal support structure.

Further areas of applicability of the teachings of the present application will become apparent from the detailed description, claims and the drawings provided hereinafter, wherein like reference numerals refer to like features throughout the several views of the drawings. It should be

DESCRIPTION

According to the principles of the present application, systems and methods are described for fabricating a cylinder head with improved structure, fatigue resistance, and heat transfer compared to conventional cylinder heads. In one example, the cylinder head generally includes a parent head casting and an internal support structure. The internal support structure is fabricated, for example, as a casting, grown as an Additive Manufactured component, or formed with interlocking extrusions. The internal support structure is fabricated from a material configured to provide additional structure, fatigue resistance, and heat transfer qualities to a parent metal (e.g., aluminum) cylinder head casting. Example materials includes a metal matrix composite (MMC) such as Al—SiC or AlBeMet.

Further, in some examples, the internal support structure is configured to be cast with the parent metal cylinder head. A Hot Isostatic Press (HIP) process is used to bond the parent head casting to the internal support structure, which gives the non-similar metals a near molecular bond. As such, the MMC structurally improved HIP cylinder head enables operation at higher pressures and power densities while providing resilience to the resulting increased heat that can cause thermal fatigue.

Figure 1:
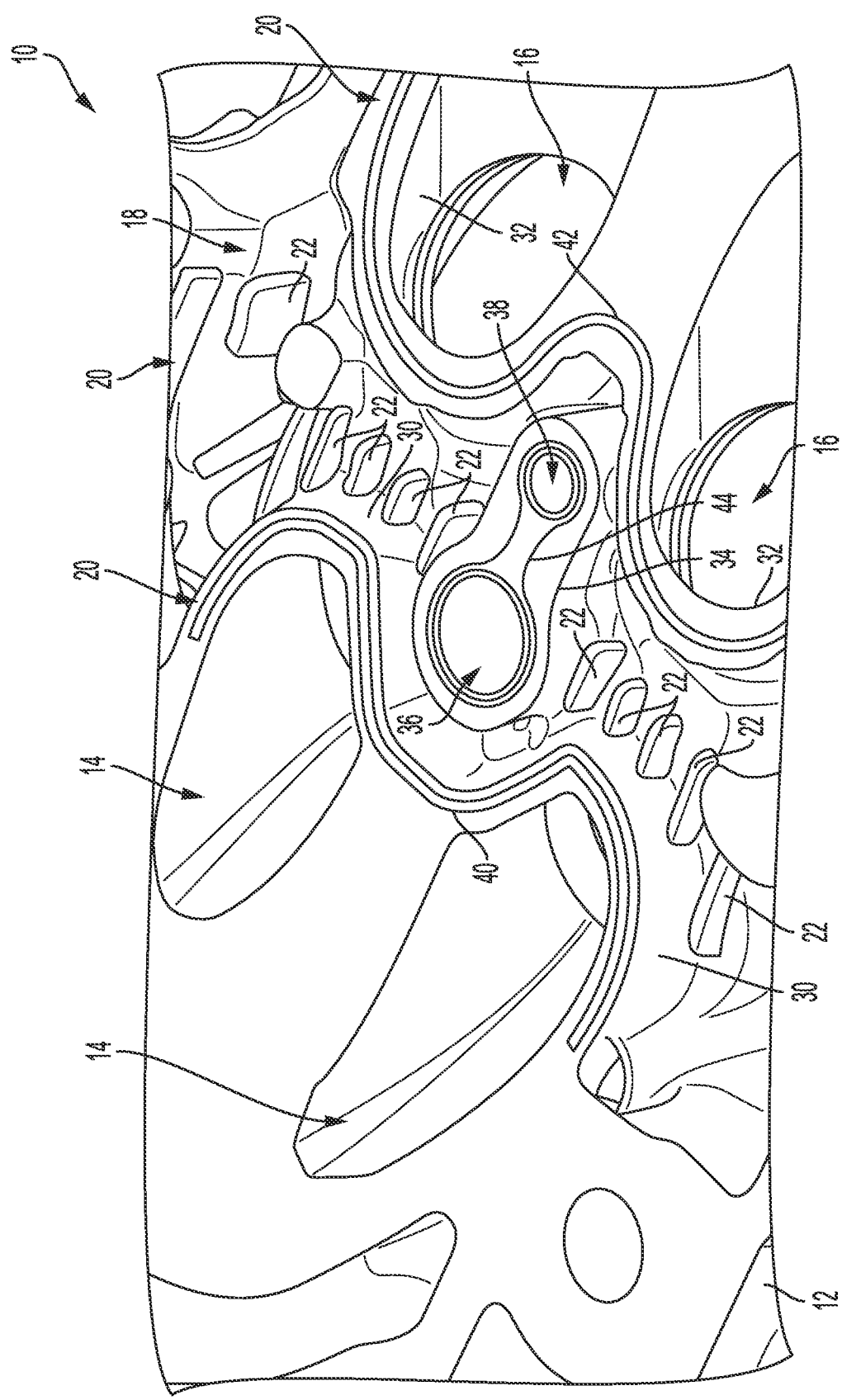
FIG. 1 is a sectional view of an example cylinder head in accordance with the principles of the present application.

Referring now to the drawings, FIG. 1 illustrates an example cylinder head assembly 10 in accordance with the principles of the present disclosure. In the example embodiment, the cylinder head assembly 10 generally includes a cylinder head casting 12 defining a plurality of intake ports 14, a plurality of exhaust ports 16, and a water jacket 18. An internal skeleton or support structure 20 is cast within the cylinder head 12 and is fabricated from any suitable material that is compatible with the parent material of the cast cylinder head, but provides increased strength and elasticity compared thereto. For example, in one implementation, the internal support structure 20 is an MMC material (e.g., aluminum silicon carbide) cast inside of an aluminum cylinder head 12. Once cast in the cylinder head 12, both the internal support structure 20 and the cylinder head 12 are subjected to an HIP process to form and densify the two components, which is configured to eliminate any gaps or internal porosity to thereby bond the dissimilar materials.

In some examples, the internal support structure 20 is completely encapsulated within the cylinder head 12. Advantageously, in such configurations, machining the cylinder head 12 with such improved qualities/structure is relatively easy since the MMC internal support structure 20 is internal to the cylinder head casting 12 and not touched by machining cutters or drills. In other examples, the internal support structure 20 includes portions extending into internal cavities of the cylinder head 12. For example, as shown in FIG. 1, internal support structure 20 includes a plurality of fins or ribs 22 protruding into the water jacket 18 that are configured to improve heat transfer to a coolant therein. In still other examples shown in FIG. 2, the internal support structure forms at least a portion of an internal surface of the cylinder head, as described herein in more detail.

With continued reference to the example embodiment shown in FIG. 1, thin walls or bridges (e.g., bridge walls) separate the various bores, apertures, or ports formed in the cylinder head 12. For example bridge walls 30 separate the intake ports 14 and the water jacket 18, and bridge walls 32 separate the exhaust ports 16 and the water jacket 18. Additionally, a bridge wall 34 includes a spark plug bore 36 and an injector bore 38 formed therein, configured to respectively receive a spark plug (not shown) and a fuel injector nozzle (not shown). As shown in the cross-sectional view of FIG. 1, walls 32 include an integrally cast wall or liner 40 of the internal support structure 20, and bridge walls 34 include an integrally cast wall or liner 42 of the internal support structure 20. Similarly, the bridge wall 34 defining the spark plug bore 36 and injector bore 38 includes an integrally cast wall or liner 44 of the internal support structure 20. As such, the encapsulated internal support structure 20, which is fabricated from a stronger and more elastic material than the parent material of the cylinder head 12, absorbs the thermal and mechanical strain and loads typically experienced at such walls/bridges, thereby reducing or preventing fatigue damage that can potentially lead to cracks or collapse.

In this way, the MMC structurally improved HIP cylinder head assembly 10 is configured to support high cylinder pressure loads of turbocharged and supercharged engines by reducing combustion chamber displacement or "oil canning" that can cause high valve seat wear and valve leakage, fatigue, and cracking. Additionally, the ribs 22 improve heat transfer to the coolant, thereby improving cylinder head fatigue resistance, and reducing combustion chamber and valve face/seat surface temperatures to reduce knock and pre-ignition tendencies.

Further, in the example embodiment, the MMC internal support structure 20 cast within the cylinder head casting 12 is configured to support combustion loads via the supporting (internal) ribs 22. The ribbed structure 22 is configured to function as an internal skeleton that is bonded to the parent metal of the head casting 12 via the HIP process. The skeleton is designed (e.g., sized and shaped) such that machining cutters and drills would not contact it, thereby not adding to the difficulty of the machining process.

Moreover, in the example embodiment, the cylinder head assembly 10 has improved fatigue resistance due at least in part to the materials of the MMC and manufacturing by the HIP process, which compacts any porosity in the casting and bonds the parent metal to the MMC core 20. Further still, the cylinder head assembly 10 provides improved heat transfer via increased coolant flow, reduced cylinder head material section thicknesses, and with added high heat transfer element(s) to the parent metal. The increased coolant flow is facilitated by the MMC internal support structure 20, which includes fins/ribs 22 that increase surface area exposure to coolant flow for improved heat transfer. Adding copper, silver, and/or other high heat transferring elements to the parent metal is configured to provide increased heat transfer in predetermined areas of the cylinder head 12 (e.g., fire deck and chamber of skulls). In one example, the MMC internal support structure 20 is encapsulated within the cylinder head casting 12 and does not intrude into the machined areas.

Figure 2:
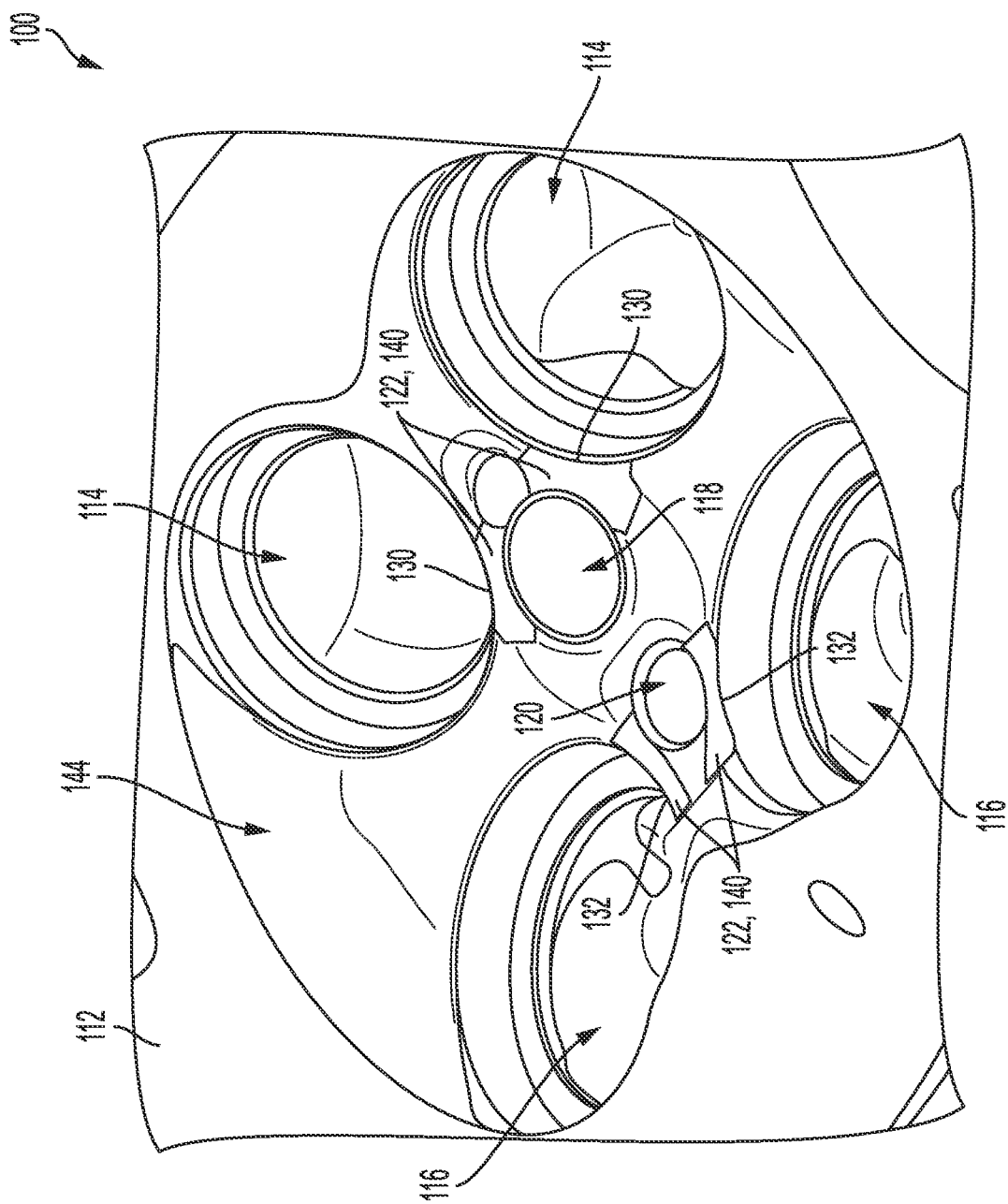
FIG. 2 is a bottom view of another example cylinder head in accordance with the principles of the present application.

Referring now to FIG. 2, an example cylinder head assembly 100 in accordance with the principles of the present disclosure is illustrated. In the example embodiment, the cylinder head assembly 100 generally includes a cylinder head casting 112 defining a plurality of intake ports 114, a plurality of exhaust ports 116, a spark plug bore 118, and an injector bore 120. An internal support structure 122 is cast within the cylinder head 112 and is fabricated from any suitable material that is compatible with the parent material of the cast cylinder head, but provides increased strength and elasticity compared thereto. For example, the internal support structure 122 is an MMC material and both the internal support structure 122 and the cylinder head 112 are subjected to a HIP process to form and densify the two components, which is configured to eliminate any gaps or internal porosity to thereby bond the dissimilar materials.

Figure 3:
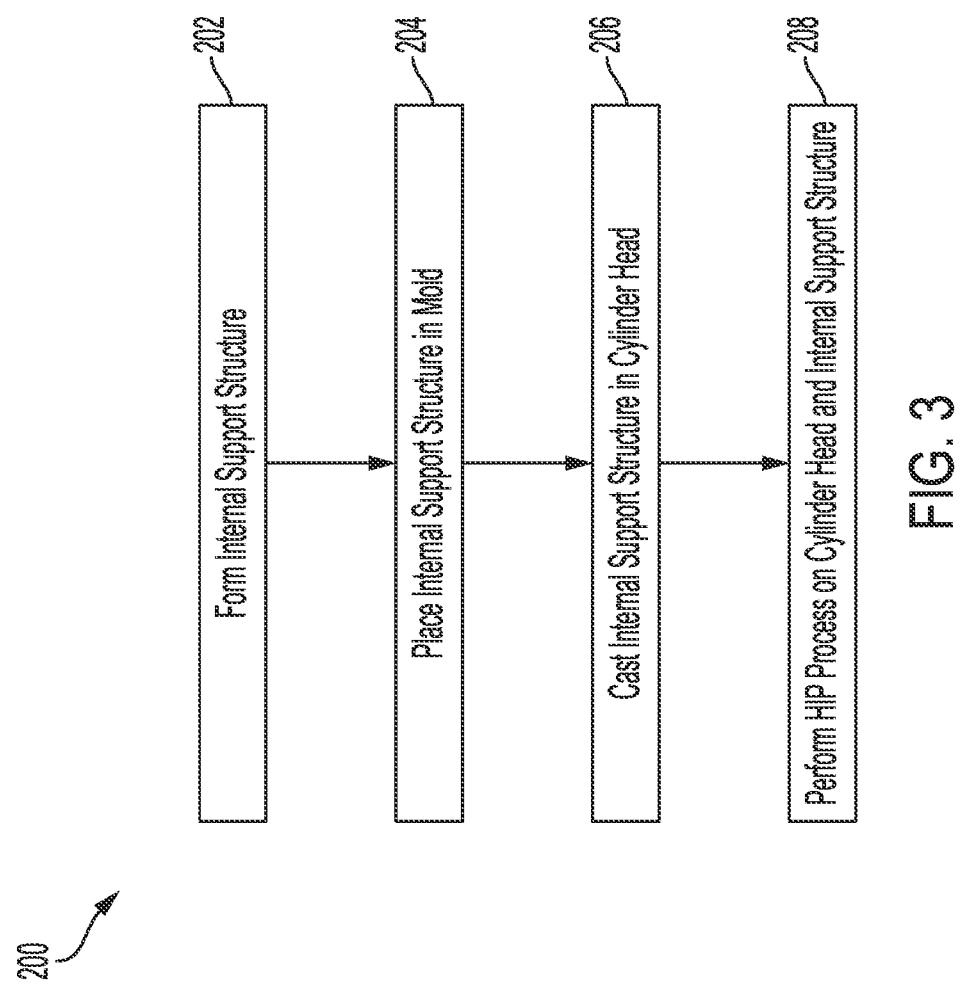
FIG. 3 is a flow diagram of an example method of making the cylinder head shown in FIGS. 1 and/or 2, in accordance with the principles of the present application.

In the example embodiment, thin walls or bridges separate the various bore, apertures, or ports formed in the cylinder head 112. For example, bridge walls 130 separate the intake ports 114 and the spark plug bore 118, and bridge walls 132 separate the exhaust ports 116 and the injector bore 120. As shown in FIG. 3, bridge walls 130, 132 are formed at least partially by the internal support structure 122, which includes exposed end surfaces 140 that define at least a portion of an internal wall 142 that in turn at least partially defines a combustion chamber 144. Accordingly, the integrated internal support structure 122, which is fabricated from a stronger and more elastic material than the parent material of the cylinder head 112, absorbs the thermal and mechanical strain and loads typically experienced at such walls/bridges, thereby reducing or preventing fatigue damage that can potentially lead to cracks or collapse. Advantageously, internal support structure 122 additionally provides heat and fatigue resistant surfaces 140 for cylinder head combustion face bridges 130, 132.

With additional reference to FIG. 3, an example method 200 of fabricating cylinder head assembly 10, 100 is described in more detail. At step 202 the internal support structure 20, 122 is fabricated, for example, via casting, additive manufacturing, extrusion, etc. The internal support structure 20, 122 is fabricated from a material (e.g., MMC material) providing increased strength, fatigue resistance, and/or heat transfer qualities compared to a cylinder head parent material (e.g., aluminum). At step 204, the formed internal support structure 20, 122 is placed in a mold. At step 206, cylinder head 12, 112 is casted to at least partially encapsulate the internal support structure 20, 122 therein. At step 208, the cast cylinder head assembly 10, 100 undergoes a HIP process to bond the parent material of the cylinder head with the internal support structure material, thereby establishing a molecular or near molecular bond between the non-similar materials.

Described herein are systems and methods for manufacturing a cylinder head with improved cylinder head structure, improved cylinder head fatigue resistance, and improved cylinder head heat transfer. An HIP process is utilized to bond a parent head casting to an MMC internal support structure to form an MMC structurally improved HIP cylinder head capable of handling the high thermal gradients and high cylinder pressure loads of modern charged engines, thereby facilitating preventing combustion chamber displacement that can result in high valve seat wear, valve leakage, fatigue, and cracking.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A cylinder head assembly for an internal combustion engine, comprising:
    a cast cylinder head defining a combustion chamber and fabricated from a first material; and
    an internal support structure at least partially encapsulated within the cast cylinder head,
    wherein the internal support structure is fabricated from a thermal strain and fatigue resistant second material, different from the first material, such that during engine operation, thermal and mechanical loads are transferred to the internal support structure to reduce combustion chamber displacement, and
    wherein the internal support structure and the cylinder head are bonded via a hot isostatic pressing (HIP) process to eliminate internal porosity and gaps therebetween.

2. The cylinder head assembly of claim 1, wherein the second material has higher strength, fatigue resistance, and heat transfer properties than the first material.

3. The cylinder head assembly of claim 1, wherein the second material is a metal matrix composite (MMC).

4. The cylinder head assembly of claim 3, wherein the second material is aluminum silicon carbide.

5. The cylinder head assembly of claim 4, wherein the first material is aluminum.

6. The cylinder head assembly of claim 1, wherein the internal support structure is totally encapsulated within the cast cylinder head and then subjected to the HIP process, and wherein the internal support structure is not disposed in machined areas.

7. The cylinder head assembly of claim 1, wherein the cylinder head further includes a water jacket, and wherein the internal support structure includes a plurality of fins extending into the water jacket configured to increase surface area exposure to coolant flowing the water jacket to increase heat transfer from the cylinder head to the internal support structure.

8. The cylinder head assembly of claim 1, wherein the cylinder head defines the combustion chamber with at least one intake port and at least one exhaust port.

9. The cylinder head assembly of claim 8, wherein the cylinder head further includes a bridge wall adjacent the at least one intake port and the at least one exhaust port, wherein at least a portion of the bridge wall includes the internal support structure to facilitate reducing thermal strain and fatigue at the bridge wall.

10. The cylinder head assembly of claim 8, wherein the cylinder head further includes a water jacket separated from the at least one intake port by a bridge wall, wherein at least a portion of the bridge wall includes the internal support structure to facilitate reducing thermal strain and fatigue at the bridge wall.

11. The cylinder head assembly of claim 8, wherein the cylinder head further includes a spark plug bore and an injector bore.

12. The cylinder head assembly of claim 11, wherein the cylinder head further includes a bridge wall between the spark plug bore and the injector bore, wherein at least a portion of the bridge wall includes the internal support structure to facilitate reducing thermal strain and fatigue at the bridge wall.

13. The cylinder head assembly of claim 11, wherein the cylinder head further includes a bridge wall between the spark plug bore and the at least one intake port, wherein at least a portion of the bridge wall includes the internal support structure to facilitate reducing thermal strain and fatigue at the bridge wall.

14. The cylinder head assembly of claim 13, wherein the cylinder head further includes a second bridge wall between the injector bore and the at least one exhaust port, and wherein at least a portion of the second bridge wall includes the internal support structure to facilitate reducing thermal strain and fatigue at the second bridge wall.

15. The cylinder head assembly of claim 1, wherein the combustion chamber is defined by an internal wall, wherein at least a portion of the internal wall is an end surface of the internal support structure.

16. A method of manufacturing a cylinder head assembly for an internal combustion engine, comprising:
    forming an internal support structure;
    casting a cylinder head defining a combustion chamber from a first material;
    at least partially encapsulating the internal support structure in the cylinder head casting, the internal support structure fabricated from a thermal strain and fatigue resistant second material, different from the first material, such that during engine operation, thermal and mechanical loads are transferred to the internal support structure to reduce combustion chamber displacement; and
    subjecting the internal support structure and the cylinder head to a hot isostatic pressing (HIP) process to bond the first and second materials to eliminate internal porosity and gaps therebetween.

17. The method of claim 16, wherein the second material is a metal matrix composite (MMC).

18. The method of claim 16, further comprising casting the cylinder head with a plurality of bridge walls each including the internal support structure to facilitate reducing thermal strain and fatigue at each bridge wall of the plurality of bridge walls.

19. The method of claim 16, further comprising forming the internal support structure with a plurality of fins, which extend into a water jacket formed in the cylinder head to thereby increase surface area exposure to coolant flowing in the water jacket to increase heat transfer from the cylinder head to the internal support structure.

* * * * *